E. RICHARDS.
VALVE.
APPLICATION FILED FEB. 9, 1916.
1,253,098.
Patented Jan. 8, 1918.
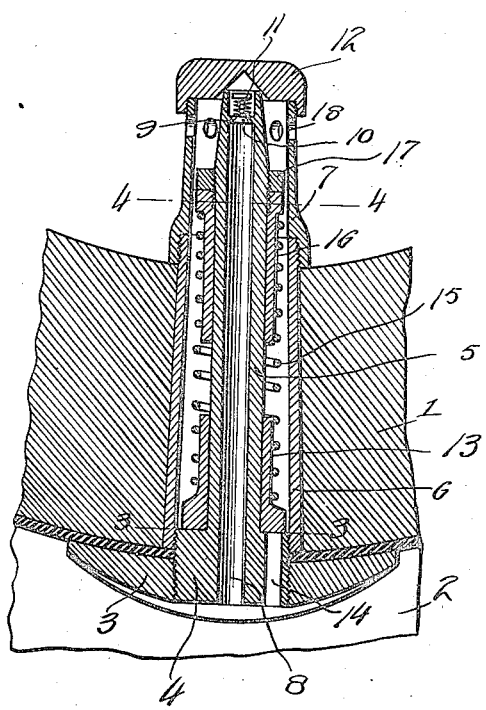
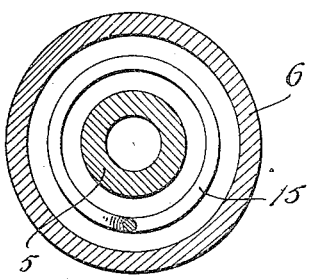
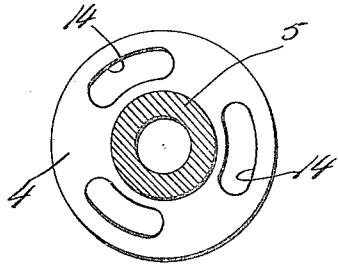
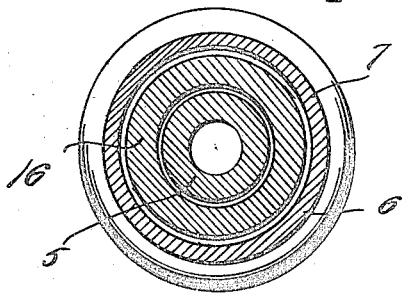
INVENTOR
Elmer Richards
WITNESSES
BY
ATTORNEY

UNITED STATES PATENT OFFICE.

ELMER RICHARDS, OF LOS ANGELES, CALIFORNIA.

VALVE.

1,253,098.

Specification of Letters Patent.

Patented Jan. 8, 1918.

Application filed February 9, 1916. Serial No. 77,263.

*To all whom it may concern:*

Be it known that I, ELMER RICHARDS, a citizen of the United States, residing at Los Angeles, in the county of Los Angeles and State of California, have invented certain new and useful Improvements in Valves, of which the following is a specification.

This invention relates to valves and more particularly to a valve especially designed for use in connection with pneumatic tires.

The principal object of the invention is to provide a valve which will permit of escape of air therethrough from the tire when the pressure within the tire is increased due to the passage of the vehicle over rough or uneven surfaces to prevent bursting of the tires.

Another object of the invention is to provide a valve which will permit of escape of the air from the inner tube and which will also serve as a means whereby the tire may be inflated.

A further object of the invention is to provide adjustable means so that the pressure within the tire necessary to open the escape means may be permitted to be varied.

A still further object of the invention is to provide a valve which is so constructed and which is adapted to be so arranged with respect to the inner tube of the tire as to prevent creeping of the inner tube about the rim.

With the foregoing and other objects in view, the invention consists in the novel features of construction, combination and arrangement of parts as will be hereinafter more fully described, illustrated in the accompanying drawings, and claimed.

In the drawings:

Figure 1 is a vertical sectional view through the improved valve showing the same in applied position upon a vehicle wheel.

Fig. 2 is a transverse section through the valve.

Fig. 3 is a similar section on the line 3—3 of Fig. 1; and

Fig. 4 is a similar section on the line 4—4 of Fig. 1.

Referring to the drawings by numerals wherein is illustrated the preferred embodiment of my invention, 1 designates the rim of a vehicle wheel upon which is supported the casing of a pneumatic tire which has arranged therein the usual inner tube 2.

The improved valve comprises a plate 3 of any desired size and shape which is adapted to be arranged within the inner tube 2. This plate is provided with a threaded opening to receive the exteriorly threaded head 4 of a tubular member 5. The head 4 is carried upon the lower end of the tubular member and is enlarged and projects laterally therefrom, and is of a length greater than the thickness of the plate so that when the same is threaded within the plate, a portion thereof will project beyond the inner face of the plate.

An opening is formed in the inner tube 2 through which the head 4 passes which will permit the inner face of the plate 3 to engage against the inner face of the inner tube adjacent said opening. A casing 6 of tubular form has its lower end internally threaded for threaded engagement with the upper end of the head 4. This casing extends through an opening in the rim 1 and has its upper end exteriorly threaded and extending slightly beyond the inner face of the rim to threadedly receive a second tubular member 7. This member 7 has its inner edge engaged against the inner face of the rim so that the plate 3 may be drawn into clamping relation with the inner tube to prevent creeping of the inner tube about the rim.

The tubular member 5 is of less diameter than the diameter of the opening within the tube 6 and extends throughout the length of the tube and the tubular member 7. This tubular member 5 is provided with a bore 8 which extends throughout the length thereof and through the head 4.

A valve seat 9 is formed within the bore of the tubular member 5 near its upper end with which engages a valve 10. This valve opens inwardly to admit of air being passed through the bore and into the inner tube and is normally held in a seated position by means of a spring 11 mounted between the seat and a head carried upon a stem extending from the valve.

Dust or other foreign matter is prevented from finding its way into the bore of the tubular member 5 by reason of a dust cap 12 which is threaded upon the outer end of the tubular member 7 and which is provided with a conically shaped recess, the walls of which are adapted for engagement with the outer edge of the said tubular member 5.

By enlarging the head 4 and extending the same laterally from the tubular member 5, a seat is provided for a valve member 13 which is slidably arranged upon the tubular member 5. This valve member at its lower end is enlarged so as to cover outlet openings 14 extending through the head. This valve member is normally held in a position to close the openings 14 and prevent escape of the air from within the inner tube by means of a spring 15 which is arranged about the valve 7 and exerts a pressure against the enlarged lower end of the same to hold the valve member in engagement with the head.

Near its upper end, the tubular member 5 is exteriorly threaded to threadedly receive the upper interiorly threaded end of an adjustable sleeve 16, a lock nut 17 being also threaded upon the tubular member 5 for engagement with the upper end of the sleeve 16 for locking the sleeve in any adjusted position longitudinally of the tubular member 5. The sleeve 16 is provided with a seat for the upper end of the expansible spring 15 so that by threading the sleeve in one direction upon the tubular member 5, the tension of the spring may be lessened while by threading the same in the opposite direction, the tension of the spring may be increased. By thus adjusting the spring, the pressure required to unseat the valve member 13 may be varied as will be understood.

In operation, the tension of the spring is adjusted so that the valve member 13 will open to permit escape of the air from within the inner tube at any desired pressure. The cap 12 is removed and air supplied to the tube in the ordinary manner. As soon as the desired pressure has been provided within the inner tube, the cap 12 is replaced. As the vehicle travels over rough or uneven surfaces the weight thereof upon the tire will constantly vary as will also the pressure within the tire. When pressure is so formed within the inner tube, and when such pressure passes above a predetermined point, that is above the point to overcome the tension of the spring 15, the valve member 13 will be raised and the air permitted to escape through the casing 6 and out through the openings 18 in the tubular member 7.

From the foregoing description taken in connection with the accompanying drawings, it is thought that the construction and operation of my improved valve will be readily understood and while I have herein shown and described one preferred embodiment of my invention, I do not wish to be limited thereto except for such limitations as the claims may impart.

I claim:

1. In a valve of the character described a plate adapted to be removably mounted upon one face of a pneumatic tube, a head detachably engaged with the plate and having openings therein, a tubular member extending from the head, the head and tubular member being provided with a continuous bore, a valve resiliently retained in a position to cover the openings in the head, a check valve positioned in the bore of the tubular member, a tubular casing detachably connected with the head and adapted to bear against the pneumatic tube, and a closure closing the outer end of the tubular casing and adapted to engage the felly.

2. The combination with a pneumatic tire, of a removable plate arranged upon the one face thereof, a head having detachable engagement with the plate and having a plurality of openings, a tubular member extending from the head, the tubular member and head being provided with a continuous bore, a valve positioned on the tubular member, a coil spring urging the valve to a position to cover the openings in the head, a check valve arranged in the bore of the tubular member, a casing threaded on the head and encircling the tubular member and engaging the tire, a closure detachably engaged with one end of the casing and including a cylindrical thimble and a dust cap closing one end of said thimble, said closure being provided with openings to permit escape of air from said casing.

3. The combination with a body having a transverse opening therein, a pneumatic tube arranged thereon, of a plate removably arranged upon one face of the pneumatic tube, a head threadedly engaged with the plate and having openings therein, a tubular member extending from the head and within the opening in the body, the head and tubular member being provided with a continuous bore, a valve resiliently retained in a position to cover the openings, a check valve positioned in the bore of the tubular member, a tubular casing positioned in the transverse opening and having threaded engagement with the head and bearing against the pneumatic tube, a thimble threaded upon the outer end thereof and bearing against the body, and a dust cap engaged upon the outer end of the thimble.

In testimony whereof I affix my signature in presence of two witnesses.

ELMER RICHARDS.

Witnesses:
E. M. LANE,
J. A. GALVIN.